United States Patent
Kumar et al.

(10) Patent No.: US 12,258,849 B2
(45) Date of Patent: Mar. 25, 2025

(54) ARRANGEMENT FOR SUPPORTING CRANKSHAFT BEARINGS IN HYDRAULIC FRACTURING PUMP

(71) Applicant: SPM Oil & Gas Inc., Fort Worth, TX (US)

(72) Inventors: Chandu Kumar, Fort Worth, TX (US); Johnny Eric DeLeon, II, Arlington, TX (US); Jeffrey Haiderer, Fort Worth, TX (US); Chih Hau Chen, Plano, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 146 days.

(21) Appl. No.: 18/184,880

(22) Filed: Mar. 16, 2023

(65) Prior Publication Data

US 2024/0309740 A1    Sep. 19, 2024

(51) Int. Cl.
| | |
|---|---|
| *F16C 35/077* | (2006.01) |
| *E21B 43/26* | (2006.01) |
| *F04B 53/00* | (2006.01) |
| *F04B 53/16* | (2006.01) |
| *F16C 35/04* | (2006.01) |

(52) U.S. Cl.
CPC ........ *E21B 43/2607* (2020.05); *F04B 53/006* (2013.01); *F04B 53/16* (2013.01); *F16C 35/042* (2013.01); *F16C 35/077* (2013.01); *F16C 2220/06* (2013.01); *F16C 2360/42* (2013.01)

(58) Field of Classification Search
CPC .. F16C 3/06; F16C 9/02; F16C 35/042; F16C 35/077; F16C 2220/02; F16C 2220/06; F16C 2360/42; F04B 39/0094; F04B 53/006; F04B 53/16; E21B 43/2607
See application file for complete search history.

(56) References Cited

U.S. PATENT DOCUMENTS

| | | | |
|---|---|---|---|
| 1,759,147 A * | 5/1930 | Vincent | F16C 21/00 384/126 |
| 1,924,562 A * | 8/1933 | Lower | F16C 21/00 384/457 |
| 3,672,734 A | 6/1972 | Bando | |
| 6,971,802 B2 | 12/2005 | Vezina | |
| 7,594,760 B2 | 9/2009 | Goss et al. | |
| 8,602,656 B2 | 12/2013 | Mashino et al. | |
| 2003/0108262 A1 | 6/2003 | Bell | |

FOREIGN PATENT DOCUMENTS

| | | | | |
|---|---|---|---|---|
| CA | 3165190 A1 * | 8/2021 | | F01B 9/02 |
| JP | 2571659 B2 | 1/1997 | | |
| JP | 2010203581 A * | 9/2010 | | F16C 35/042 |
| JP | 6137260 B2 | 5/2017 | | |
| WO | WO-2016014967 A1 * | 1/2016 | | B21K 1/26 |

* cited by examiner

*Primary Examiner* — Phillip A Johnson

(57) ABSTRACT

An arrangement for supporting one or more bearings of a crankshaft assembly of a hydraulic fracturing pump includes a frame and one or more bearing supports. The frame is of a first material and defines one or more bearing support profiles. The bearing supports are of a second material different from the first material of the frame. The bearing supports are cast-in-place within the corresponding bearing support profiles of the frame and are configured to be in contact with an outer race of the corresponding bearings of the crankshaft assembly. Compared to the first material of the frame, the second material of the bearing supports is more effective at preventing slippage of the bearings.

20 Claims, 9 Drawing Sheets

ARRANGEMENT FOR SUPPORTING CRANKSHAFT BEARINGS IN HYDRAULIC FRACTURING PUMP

TECHNICAL FIELD

The present disclosure relates to a hydraulic fracturing pump having a crankshaft. More particularly, the present disclosure relates to an arrangement to support bearings that enables a rotation of the crankshaft.

BACKGROUND

Hydraulic fracturing is a well-stimulation technique in which a high-pressure fluid is injected downhole through a surface to fracture a subterranean rock under the surface. Hydraulic fracturing involves injecting a high-pressure fluid into a wellbore to create cracks in the rock through which hydrocarbons (e.g., natural gas, petroleum, etc.) may flow into the wellbore. The injected fluid may be pressurized by a pump at the surface. The pump may be, for example, a reciprocating hydraulic fracturing pump which includes a power end and a fluid end. The power end typically facilitates conversion of rotational energy/motion into reciprocating energy/motion, and, in response, the fluid end may generally use the reciprocating energy/motion to execute a pumping action and deliver a pressurized fluid to an outlet.

The power end of the pump may include a frame, one or more bearings which may be housed within the frame, and a crankshaft which may be supported by the bearings so that the crankshaft can rotate with respect to the frame and in turn power an operation of the fluid end of the pump. The bearings may include outer races which may be disposed in contact with the frame. Usage of the pump may cause one or more of the outer races to slip against the frame, potentially causing portions of the frame and/or the outer races to wear out over time, leading to unsupported bearings, and thus frame and/or bearing failures and pump downtime.

U.S. Pat. No. 7,594,760 relates to a bearing cup having a ring and a shoulder extending radially inward from an inner surface of the ring. A tang extends axially outward from a first side of the ring. A tab extends axially outward from a second side of the ring opposite the first side. A slot is formed in the second side. The bearing cup prevents the outer race of a conventional rolling element bearing from rotating or spinning while allowing the bearing to move in an axial direction. The device also prevents frictional sliding between a bearing assembly outer race and a preload spring.

SUMMARY OF THE INVENTION

In one aspect, the disclosure relates to an arrangement for supporting one or more bearings of a crankshaft assembly of a hydraulic fracturing pump. The arrangement includes a frame and one or more bearing supports. The frame is of a first material and defines one or more bearing support profiles. The bearing supports are of a second material different from the first material of the frame. The bearing supports are cast-in-place within the corresponding bearing support profiles of the frame and are configured to be in contact with an outer race of the corresponding bearings of the crankshaft assembly. Compared to the first material of the frame, the second material of the bearing supports is more effective at preventing slippage of the bearings.

In another aspect, the disclosure is directed to a bearing support for a power end of a hydraulic fracturing pump. The bearing support includes an annular body defining an axis, an inner surface of the annular body configured to engage an outer race of a crankshaft bearing, and an outer surface of the annular body configured to fit a bearing support profile of a frame of the power end. At opposite axial ends of the annular body, first and second notches are defined in the outer surface. A portion of the annular body defined axially between the first and second notches is configured to extend radially past an interior surface of the bearing support profile to capture the bearing support against axial movement with respect to the frame of the power end.

In yet another aspect, the disclosure relates to a method for manufacturing a frame of a power end of a hydraulic fracturing pump. The method includes inserting one or more bearing supports into a mold of a frame. The bearing supports are formed of a first material. Further, the method includes introducing a second material of the frame, in a molten form, into the mold to cause the bearing supports to be cast-in-place with the frame.

BRIEF DESCRIPTION OF THE DRAWINGS

FIG. 7A is a partial cross-sectional view showing a portion of the bearing support of FIG. 7, in accordance with one or more aspects of the present disclosure.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
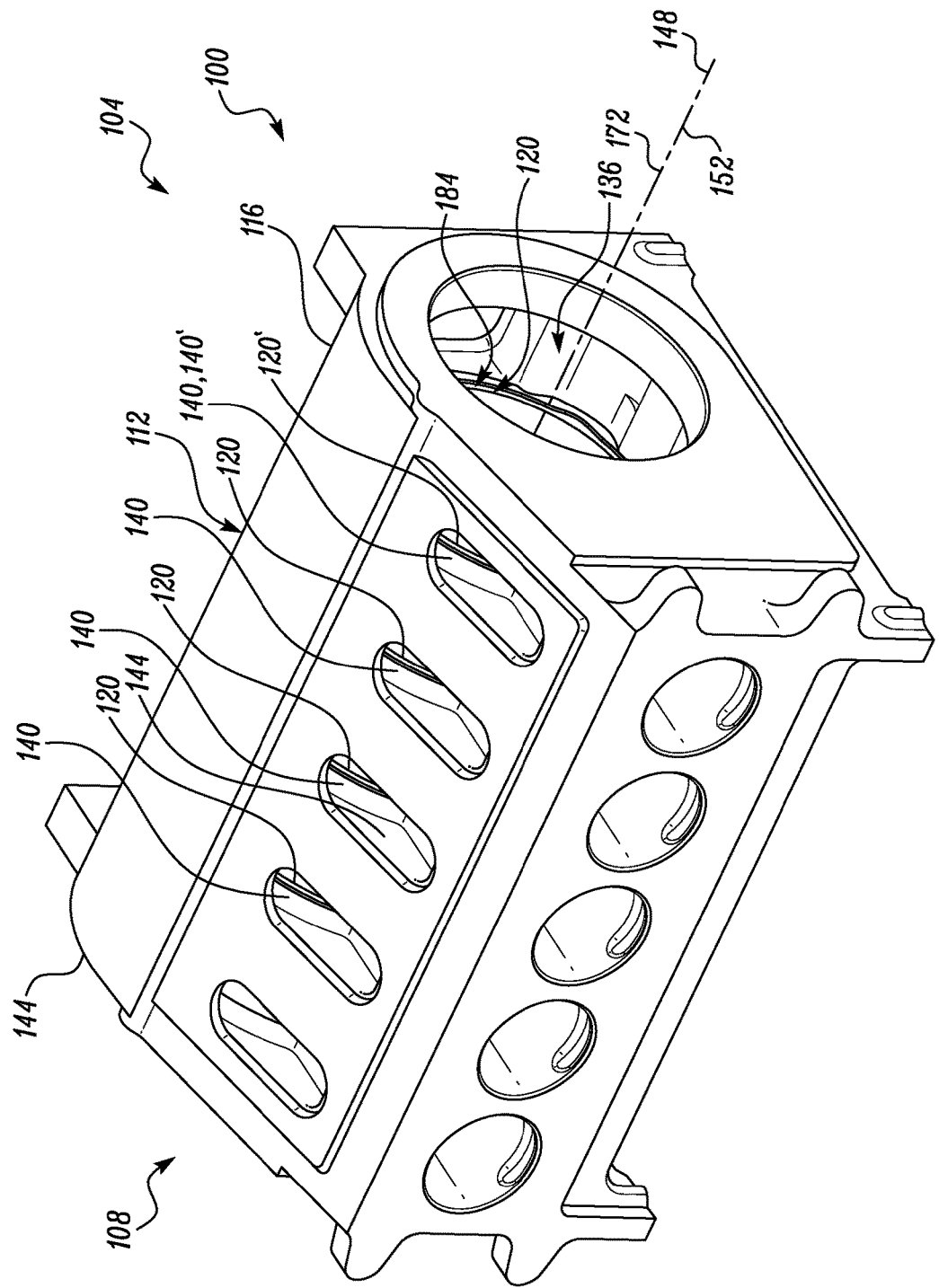
FIG. 1 is a perspective view of an arrangement for supporting one or more bearings of a crankshaft assembly of a hydraulic fracturing pump, in accordance with one or more aspects of the present disclosure.
Figure 2:
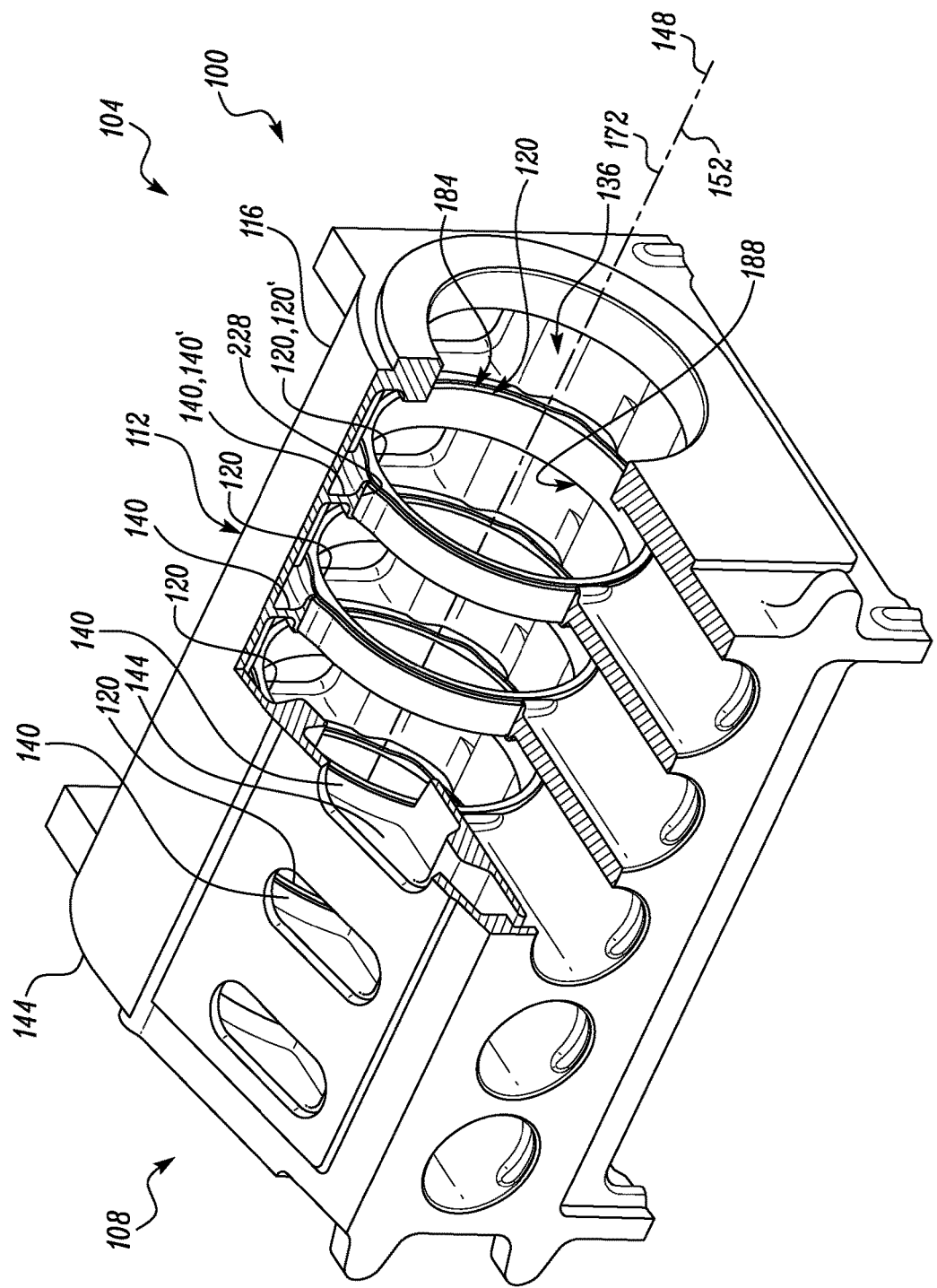
FIG. 2 is a perspective sectional view of the arrangement illustrating bearing support profiles structured within a frame of the arrangement and bearing supports provided correspondingly with the bearing support profiles, in accordance with one or more aspects of the present disclosure.

Referring to FIGS. 1 and 2, a portion 100 of a hydraulic fracturing pump 104 is shown and described. According to an example application of the hydraulic fracturing pump 104, the hydraulic fracturing pump 104 may be utilized in the extraction of hydrocarbons (e.g., petroleum, natural gas, etc.) from a geological formation under a surface of the earth (also referred to as a sub-surface geological formation). In this regard, the hydraulic fracturing pump 104 may be stationed over the surface and operated to pump and inject high-pressure fluid into a wellbore at or around the sub-surface geological formation to create cracks in rocks through which hydrocarbons (e.g., natural gas, petroleum, etc.), and/or the like, may flow into the wellbore for extraction.

Aspects of the hydraulic fracturing pump, as discussed in the present disclosure, may be suitably applied to multiple other pumps, such as reciprocating pumps, and/or to various other devices that include one or more rotating assemblies, e.g., one which includes a crankshaft. Therefore, reference to the hydraulic fracturing pump 104 is exemplary. The portion 100 of the hydraulic fracturing pump 104 illustrated in FIGS. 1 and 2, in general, corresponds to a power end 108 of the hydraulic fracturing pump 104. The hydraulic fracturing pump 104 may include various other portions working in concert with the power end 108, such as a fluid end (not shown), to effectuate a pumping action for the injection and delivery of the high-pressure fluid.

Figure 8:
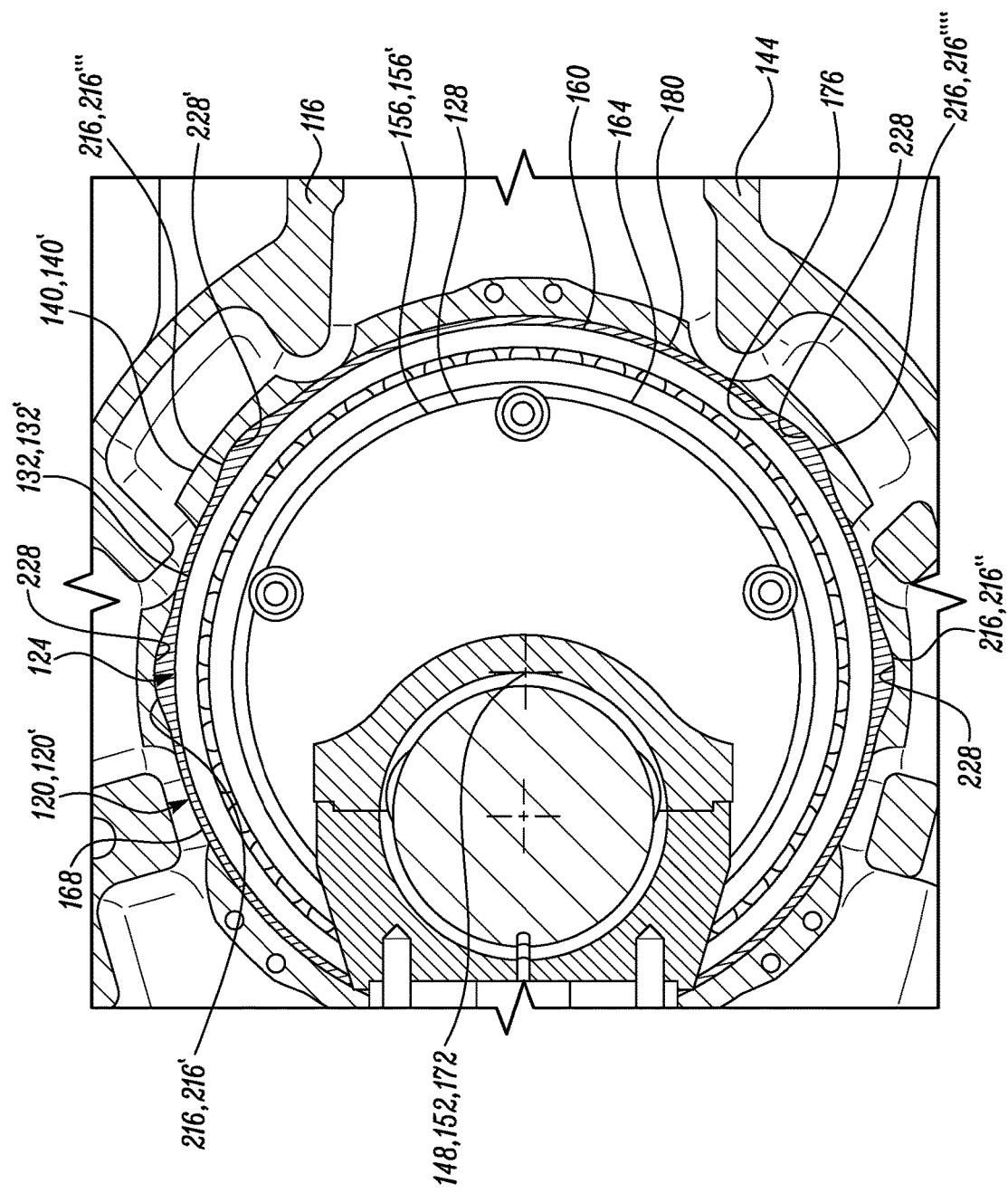
FIG. 8 is a cross-sectional view of the bearing support of FIGS. 3 through 5 cast-in-place within the frame of the arrangement, in accordance with one or more aspects of the present disclosure.

With continued reference to FIGS. 1 and 2, and also in conjunction with FIG. 8, the power end 108 of the hydraulic fracturing pump 104 may include an arrangement 112. The arrangement 112 may include a frame 116 and one or more bearing supports 120. The power end 108 may also include a crankshaft assembly 124 (see FIG. 8), which may include a crankshaft 128 and one or more bearings 132 (e.g., bearing 132' shown in FIG. 8). The arrangement 112 may support the bearings 132 of the crankshaft assembly 124, as described in more detail below.

The frame 116 may include a rigid construction, and may define one or more features (e.g., the frame 116 may define an elongated cavity 136, as shown). The elongated cavity 136 may define a cylindrical shape, although the elongated cavity 136 can include various other shapes and/or contours. Further, the frame 116 may define one or more bearing support profiles 140 (or simply profiles 140, hereinafter). The profiles 140 may be structured and arranged within the elongated cavity 136. As an example, the profiles 140 may be integral to the frame 116 and may extend from a body 144 of the frame 116 to intrude into the elongated cavity 136, as shown in FIG. 2.

The profiles 140 may define a circular shape, and may sit aligned with respect to each other to define a common axis (e.g., see profile axis 148). The frame 116 (e.g., the profile 140 and the body 144) may be made from a first material, and may be formed by casting the first material into a suitable mold (not shown). The first material may include, but not limited to, a metallic material, including one or more of ductile iron, gray iron, or cast steel. The first material may be a relatively low cost material compared to a material of the bearing supports 120, as described in more detail below. Other materials for forming the frame 116, now known or in the future developed, may be contemplated. The aforesaid examples of the first material are provided for illustrative purposes only.

The crankshaft 128 may be rotatably positioned in the elongated cavity 136 of the frame 116 such that in an assembly of the crankshaft 128 with the frame 116, the profiles 140 and the elongated cavity 136 may surround the crankshaft 128. For this purpose, the crankshaft 128 may define peripheral surfaces which may fit with the corresponding shapes of the profiles 140 and the elongated cavity 136 so as to be accommodated within the elongated cavity 136 and be rotatable with respect to the frame 116. Also, in the assembly of the crankshaft 128 with the frame 116, a rotation axis 152 (also see FIG. 8) of the crankshaft 128 may be aligned with the profile axis 148.

According to some embodiments, the crankshaft 128 may be coupled, e.g., through suitable corresponding mechanisms, to a pinion or an input drive shaft (not shown) and to one or more rods (also referred to as pony rods) (not shown) of the hydraulic fracturing pump 104. In operation, the crankshaft 128 may receive rotary power from the input drive shaft and may convert the rotary power into a reciprocating motion of the rods. The reciprocating motion of the rods may enable the development of the pumping action within the fluid end of the hydraulic fracturing pump 104. Such operation of the hydraulic fracturing pump 104 is known to those skilled in the art and thus will not be discussed further.

The bearings 132 (see bearing 132, FIG. 8) may be positioned in between the crankshaft 128 and the profiles 140 of the frame 116 to facilitate a rotation of the crankshaft 128 with respect to the frame 116. The bearings 132 may be equal in number to a number of the profiles 140 structured in the frame 116, and may be mounted around the crankshaft 128 such that the bearings 132 can be correspondingly positioned in between the crankshaft 128 and the profiles 140 of the frame 116. For example, the bearings 132 may be mounted around corresponding mounting regions 156 of the crankshaft 128 (see FIG. 8) (also in FIG. 8, see mounting region 156' on the crankshaft 128 on which the bearing 132 is mounted).

Each of the bearings 132 (see bearing 132, FIG. 8) may include an outer race 160 and an inner race 164 rotatable with respect to the outer race 160. In an assembly of the crankshaft 128 with respect to the frame 116, the inner race 164 may come in contact (e.g., in interference fit contact, such as press fit) with a corresponding mounting region 156 of the crankshaft 128 (see mounting region 156' for mounting the bearing 132' on the crankshaft 128 in FIG. 8), while the outer race 160 may be disposed immovably with respect to the frame 116 and/or to the corresponding profile 140 (i.e., see profile 140' in FIG. 8). In so doing, the bearings 132 may enable the crankshaft 128 to rotate with respect to the frame 116 for effectuating an operation of the hydraulic fracturing pump 104.

The bearing supports 120 may be positioned within the frame 116. The bearing supports 120 (or simply, supports 120 hereinafter) may also be equal in number to a number of the profiles 140 structured in the frame 116. The supports 120 may correspondingly sit in between the profiles 140 and the bearings 132 to serve as an interface between the profiles 140 and the outer races 160 of the bearings 132. As an example, the supports 120 may be correspondingly received and cast-in-place within the profiles 140 of the frame 116 such that the supports 120 may be fixedly retained with the frame 116. The supports 120 being cast-in-place within the profiles 140 of the frame 116 prevents the supports 120 from being removed from the frame 116.

Also, the supports 120 may correspondingly support (e.g., they may come in contact with and sit tightly) against the bearings 132 (e.g., correspondingly against the outer races 160 of the bearing 132) to retain the outer races 160 immovably with respect to the frame 116 (e.g., the support 120' comes in contact with the outer race 160 of the bearing 132' in FIG. 8). In this regard, the supports 120 may be made from a second material which is different from the first material of the frame 116. Compared to the first material of the frame 116, the second material of the supports 120 is more effective at preventing slippage of the bearings 132 (e.g., a slippage of the outer races 160 of the bearings 132)

with respect to the frame 116. As an example, the second material includes one or more grades of alloy steel (e.g., A36, A572, 4340, and/or 4320 as rolled plates and/or ductile steel castings).

Further details corresponding to the supports 120 will now be described. For the purposes of the present disclosure, a single bearing support (e.g., the support 120') corresponding to a single bearing support profile (e.g., the profile 140') in the frame 116 is mostly described (and annotated in the accompanying figures) (see FIGS. 3 through 7A). Aspects described for the support 120' may be suitably applied to each of the other supports 120. Aspects described for the profile 140' may also be suitably applied to each of the other bearing support profiles 140. Further, relative aspects described between the support 120' and the profile 140' may be suitably applied to each of the other supports 120 and their corresponding bearing support profiles 140. Similarly, relative aspects described between the support 120' and the corresponding bearing 132 (e.g., the bearing 132' around which the support 120' may be disposed) may be suitably applied to each of the other supports 120 and the corresponding bearings 132 around which the other supports 120 may be disposed.

Referring to FIGS. 3 through 7A, the support 120' may include an annular body 168. The annular body may define an axis 172, an inner surface 176, and an outer surface 180. Both the inner surface 176 and the outer surface 180 may, at least partly or fully, extend along an annular path, A, (see FIG. 3) defined by the annular body 168 around the axis 172. In an assembly of the support 120' with the profile 140' and the bearing 132', the inner surface 176 of the annular body 168 may engage (e.g., in interference fit contact, such as press fit) the outer race 160 of the bearing 132', and, further, the outer surface 180 of the annular body 168 may fit (e.g., in interference fit contact, such as press fit) the profile 140' of the frame 116. Further, the axis 172 may also be aligned with the profile axis 148 and the rotation axis 152.

Further, the annular body 168 may define a first axial end 184 and a second axial end 188 opposite to the first axial end 184. At the first axial end 184 and second axial end 188, a first notch 192 and a second notch 196 (see FIG. 4) may be correspondingly defined. The first notch 192 and the second notch 196 may each define an L-shaped profile. Although not limited, each of the first notch 192 and the second notch 196 may extend, at least in part or in full, around the axis 172 and/or along the annular path, A, of the annular body 168, as shown. Moreover, the first notch 192 at the first axial end 184 may define a first surface 200 and the second notch 196 at the second axial end 188 may define a second surface 204. As with the first notch 192 and the second notch 196, the first surface 200 and second surface 204 may also extend, at least in part or in full, around the axis 172 and/or along the annular path, A, of the annular body 168. As an example, the first notch 192 and the second notch 196 may be defined, at least in part, in the outer surface 180 of the annular body 168.

Further, a portion 208 (see FIGS. 4, 5, 7, and 7A) of the annular body 168 defined axially (e.g., along the axis 172) between the first notch 192 and the second notch 196 (and/or between the first surface 200 and the second surface 204) may extend radially (e.g., in a radial direction, R, with respect to the annular body 168) past an interior surface 212 (see FIG. 7A) of the profile 140' to capture and retain the support 120' against an axial movement (e.g., along the axis 172) with respect to the frame 116. Also, and/or in other words, both the first surface 200 and the second surface 204 may be integrally contactable with the frame 116 (or with the profile 140' of the frame 116) to restrict the axial movement of the support 120' along the axis 172.

The first surface 200 and/or the second surface 204 may exemplarily include flat surfaces, although it is possible that the first surface 200 and/or the second surface 204 may include other shapes. For example, the first surface 200 and/or the second surface 204 may include a frustoconical surface defined or delimited around the axis 172. For example, the first surface 200 and/or the second surface 204 may include a corrugated surface or an irregular surface. In other words, the first axial end 184 and/or the second axial end 188 of the annular body 168 may embody any suitable shape that is configured to capture and retain the support 120' with respect to the profile 140'. For example, the first surface 200 and/or the second surface 204 may be angled with respect to a radius of the annular body 168 and/or may connect the inner surface 176 and the outer surface 180, directly (e.g., without the respective notch). For example, the first axial end 184 and/or the second axial end 188 may include an angled surface that is defined from a first intersection at the inner surface 176, or from an axial end of the first notch 192 or the second notch 196, respectively. The angled surface may extend in the outward radial direction, at an angle at least in part towards an axial midpoint of the annular body 168, from the first intersection to a second intersection at the outer surface 180. Effectively, shapes of the first surface 200 and/or the second surface 204 (and/or shapes of the first axial end 184 and/or the second axial end 188), as described in the present disclosure, are not limiting and/or are purely exemplary.

Further, one or more radial extensions 216 may be defined in the outer surface 180 of the annular body 168. The radial extensions 216 may be integrally engageable with the frame 116 to inhibit a movement (e.g., a rotational movement) of the support 120' about or around the axis 172. Therefore, the expression 'radial extension' also may be referred to as 'engagement member'. As an example, the radial extensions 216 may be defined at one or more circumferential positions defined about the axis 172 of the annular body 168. In some embodiments, at least two radial extensions 216 (e.g., first radial extension 216' and second radial extension 216") may be provided in the outer surface 180. The first and second radial extensions 216', 216" may be located at diametrically opposite circumferential positions about the axis 172 of the annular body 168 (see FIG. 3). In some embodiments, the radial extensions 216 may include, in total, four radial extensions (e.g., third radial extension 216'" and fourth radial extension 216"") (see FIG. 3). The four radial extensions 216 (e.g., in the exemplary order of the first radial extension 216', the third radial extension 216'", the fourth radial extension 216"", and the second radial extension 216") may be located at circumferential positions corresponding to 12 o'clock, 1 o'clock, 5 o'clock, and 6 o'clock about the axis 172 of the annular body 168 (see FIG. 3). Greater or lesser number of radial extensions 216 may be provided in the outer surface 180.

Figure 3:
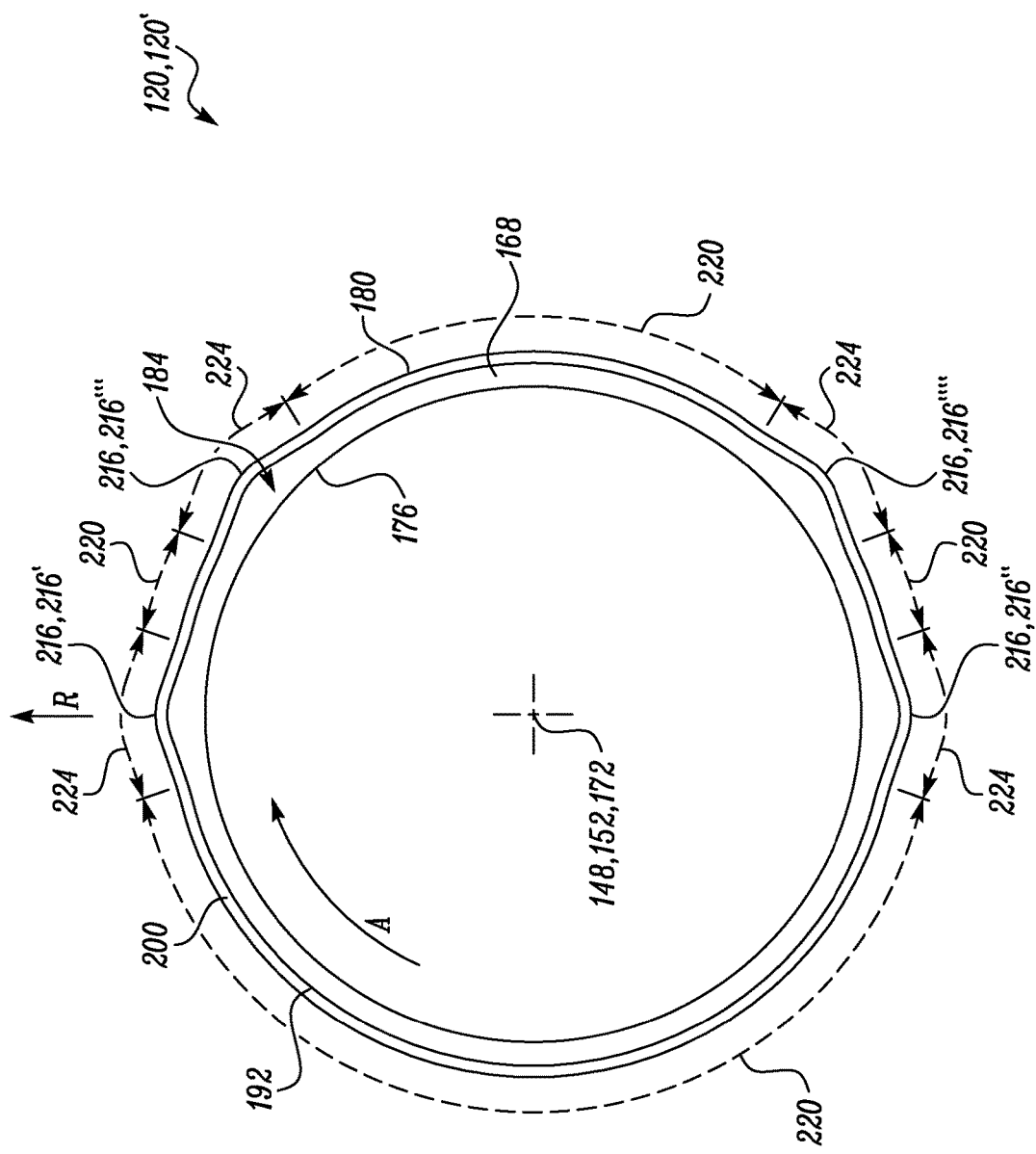
FIGS. 3 through 5 are various views of an exemplary bearing support, in accordance with one or more aspects of the present disclosure.
Figure 4:
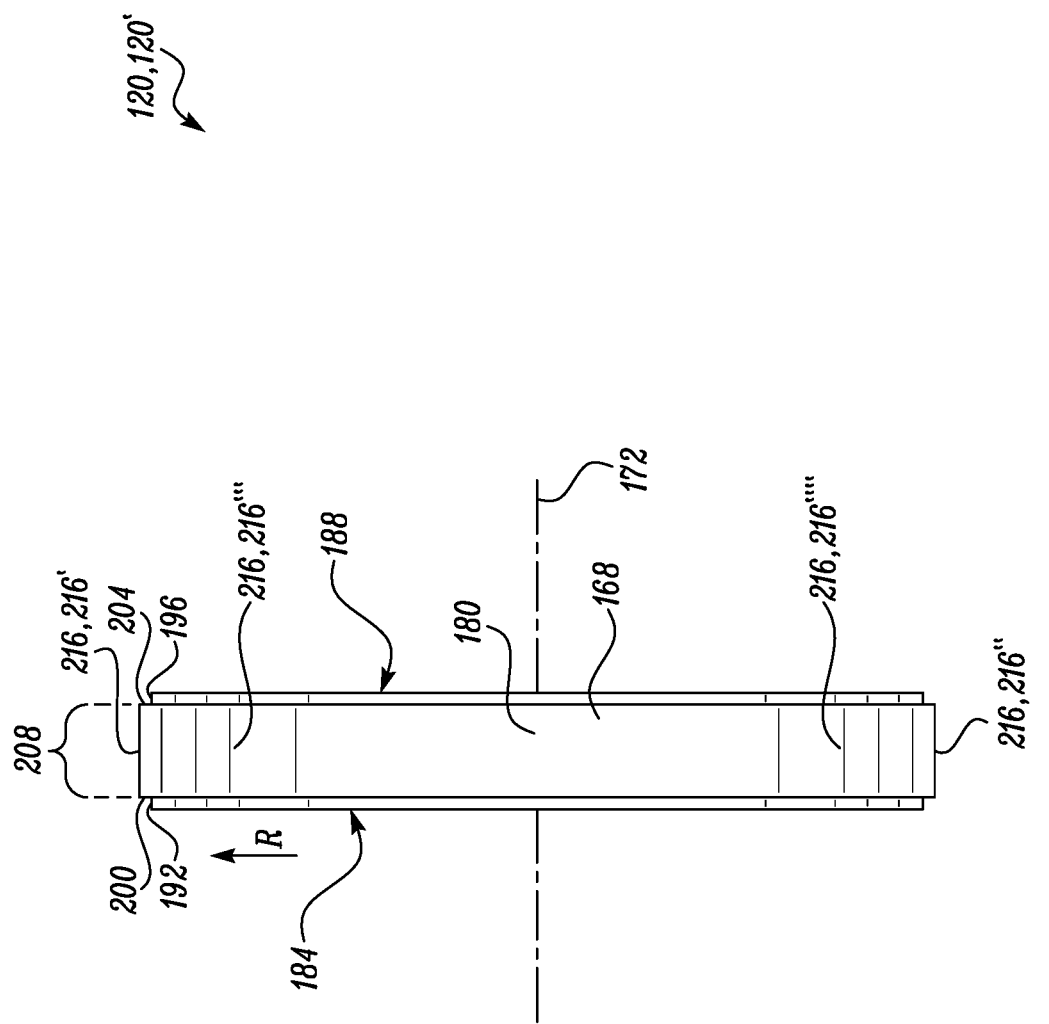
Figure 5:
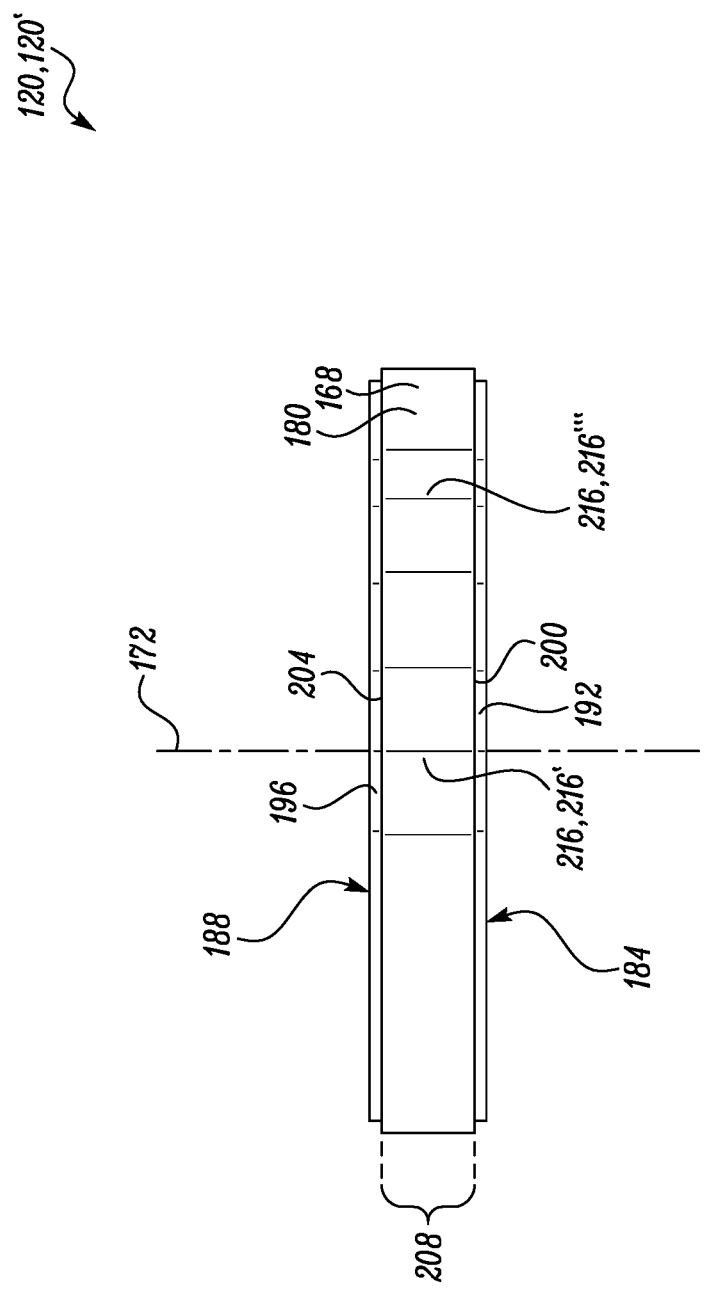
Figure 6:
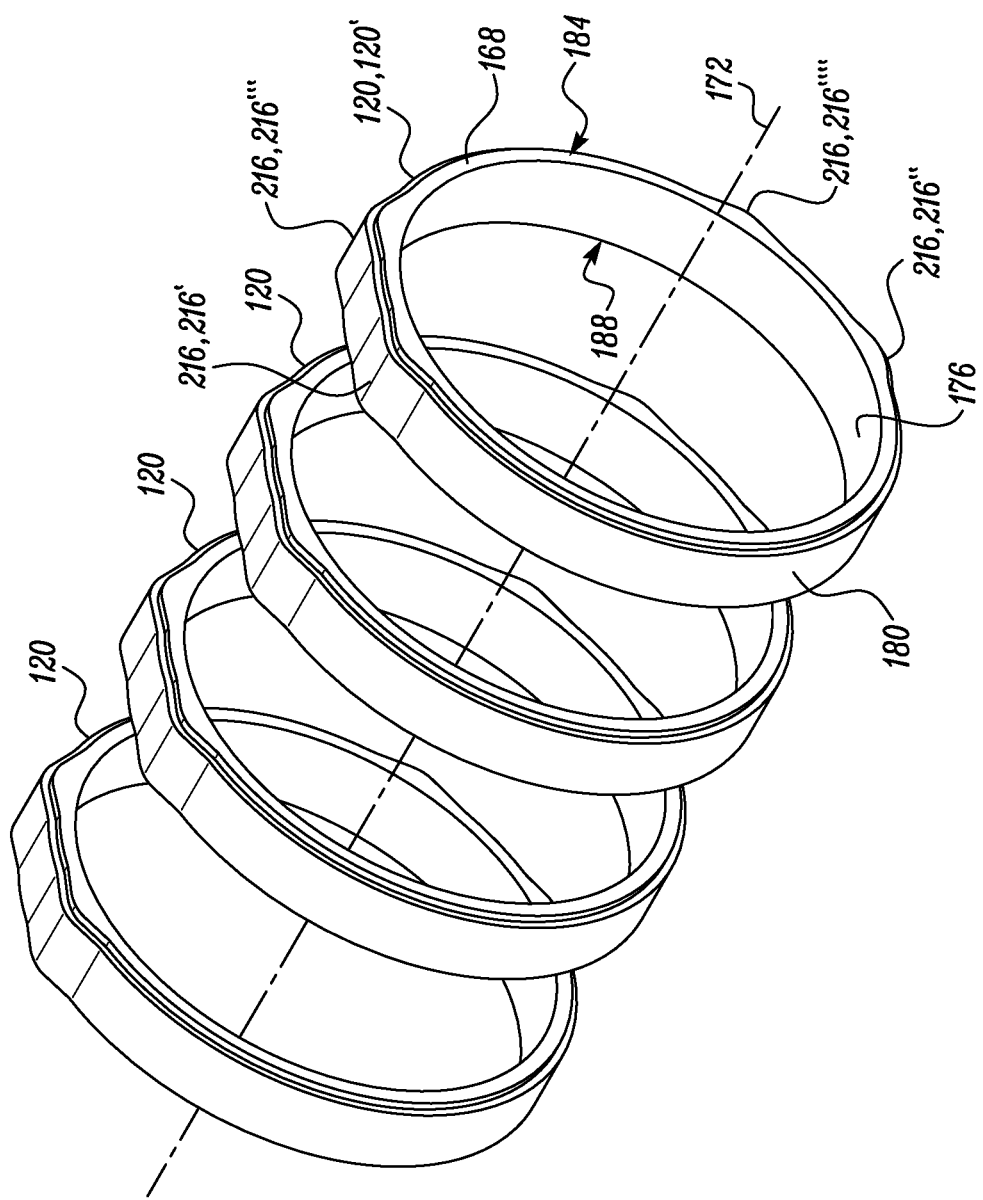
FIG. 6 is a view illustrating an exemplary layout of the bearing supports when positioned within the frame of the arrangement, in accordance with one or more aspects of the present disclosure.
Figure 7:
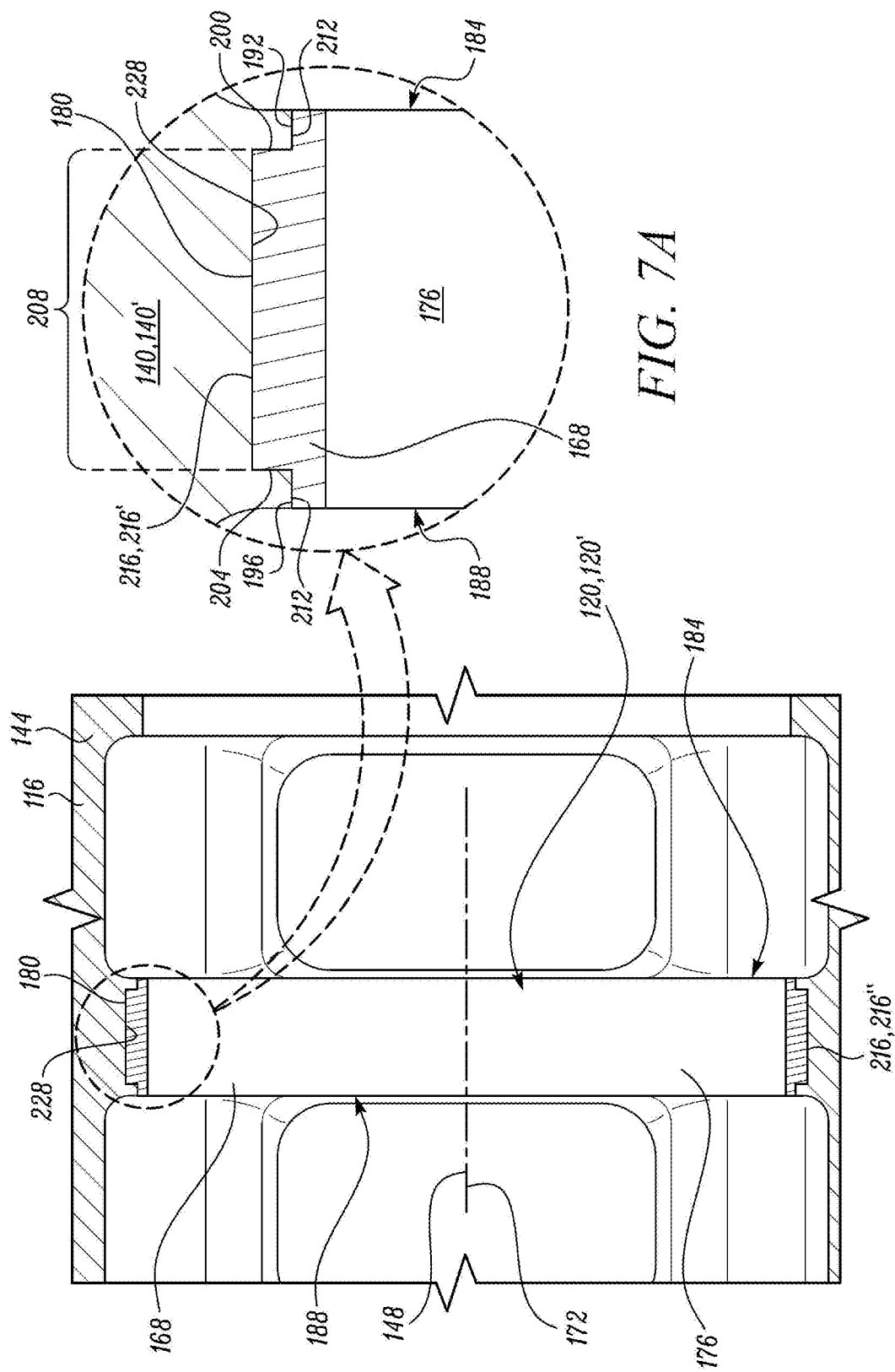
FIG. 7 is a cross-sectional view of the bearing support of FIGS. 3 through 5 cast-in-place within the frame of the arrangement, in accordance with one or more aspects of the present disclosure.

In some embodiments, the outer surface 180 of the annular body 168 defines one or more arcuate surface portions 220 imparting a generally circular profile to the annular body 168 (see FIG. 3). The term 'generally' may be understood to mean that the profile of the annular body 168 may be nearly circular owing to the arcuate surface portions 220 but may not be fully circular owing to the provisions of the radial extensions 216 around the axis 172. In this regard, the radial extensions 216 may define one or more engagement surface portions 224 (see FIG. 3) on the outer surface 180, as well. The engagement surface portions 224 may protrude radially outwards of the annular body 168 with respect to the arcuate surface portions 220. Each of the radial extensions 216 in the outer surface 180 may be defined between two corresponding arcuate surface portions 220 of the outer surface 180. In some embodiments, the engagement surface portions 224 may be integrally and contiguously merged with the arcuate surface portions 220 between which they are defined so as to define a smooth uninterrupted outer surface 180.

Also, it may be noted that the frame 116 (or the profile 140' of the frame 116) may define provisions to accommodate the radial extensions 216. In this regard, the frame 116 (or the profile 140' of the frame 116) may define recesses 228, and the radial extensions 216 may fit the corresponding recesses 228 of the profile 140' of the frame 116. In so doing, a rotational movement of the annular body 168 (or the support 120') about or around the axis 172 is effectively arrested and/or prevented. In some embodiments, the recesses 228 are defined at those portions of the frame 116 which are devoid of any feature or component so as to stay remote and away from interfering with any functioning of the hydraulic fracturing pump 104. Given that one hydraulic fracturing pump may differ from another hydraulic fracturing pump, the number and position of the recesses 228 and thus the radial extensions 216, as discussed herein, may change from one pump to another pump. Thus, the number and position of the recesses 228 and the radial extensions 216 described above are purely exemplary. Also, the radial extensions 216 can take any shape, and the shapes defined by the arcuate surface portions 220 are not limiting and/or are purely exemplary.

INDUSTRIAL APPLICABILITY

During operation, as the hydraulic fracturing pump 104 is activated, an input drive shaft or the pinion may be energized to rotate and in turn power a rotation of the crankshaft 128 about the rotation axis 152. As the crankshaft 128 rotates, the crankshaft 128 may convert the rotary power received from the input drive shaft or the pinion into a reciprocating motion of one or more rods of the hydraulic fracturing pump 104. In that manner, the crankshaft 128 may facilitate the generation of suction and the production of the pumping action to draw and supply fluid to an outlet (not shown) of the hydraulic fracturing pump 104. During pump operation, as the crankshaft 128 rotates, the inner race 164 follows and rotates with the rotation of the crankshaft 128, while the outer race 160 (and the arrangement 112) remains stationery with respect to the crankshaft 128.

During the aforesaid rotation of the crankshaft 128, given that as compared to the first material of the frame 116, the second material of the support 120' is more effective at preventing slippage of the bearing 132" (or the outer race 160 of the bearing 132) with respect to the frame 116, and because the outer race 160 contacts the support 120' (and not the frame 116), a slipping of the bearing 132 (or the outer race 160 of the bearing 132) with respect to the frame 116 is mitigated (or altogether prevented). In some embodiments, a galling property of the first material and the second material (e.g., hardness) may allow for the bearing 132' and the support 120' to microscopically weld with each other and restrict relative motion (i.e., slippage) therebetween, a condition which may be absent had frame 116 been in contact with the bearing 132.

Such reduction of slippage prolongs the useful life of the frame 116 and the bearing 132, reduces downtime and service costs, and were the support 120' to wear out over a period, makes it easier and more cost effective for the support 120' to be repaired or be replaced with a new support identical to the support 120', thus also easing manufacturability and serviceability of the frame 116. Further, the integration of the frame 116 with the support 120' allows the overall structure of the arrangement 112 to be retained as an integral unit formed from the first material and the second material. Such integration of the first material and the second material helps retain properties of the frame 116 which are suitable for conventional operations of the hydraulic fracturing pump 104 and also helps prevent (or altogether arrest) a slippage of the outer race 160 of the bearing 132 with respect to the frame 116.

Figure 9:
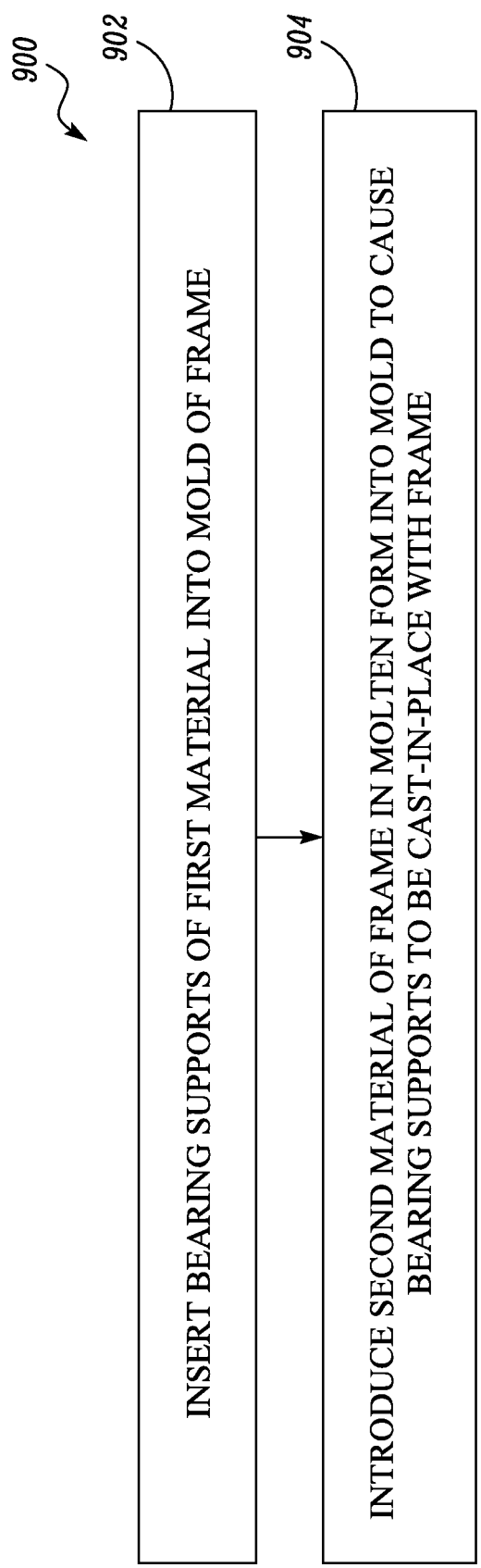
FIG. 9 is an exemplary flowchart illustrating a method for manufacturing the frame, in accordance with one or more aspects of the present disclosure.

An exemplary method of manufacturing the frame 116 or the arrangement 112 of the power end 108 of the hydraulic fracturing pump 104 will now be discussed. The method may include an exemplary casting process (see flowchart 900, FIG. 9). As part of a first stage 902 (see FIG. 9) of the casting process, the support 120' of a first material may be positioned or inserted into a mold (not shown) of the frame 116. Thereafter, as part of a second stage 904 (see FIG. 9) of the casting process, a second material, in a liquid molten form, may be poured or introduced into the mold. The liquid molten form of the second material may be cooled down and solidified so as to cause or result in the formation of the frame 116 with the support 120' cast-in-place with the frame 116. In some embodiments, as the molten form of the second material cools down and solidifies, the profile 140' metallurgically bonds with the support 120' such that the support 120' can be retained with the frame 116.

It may be noted that the expressions 'first material' and 'second material' used to explain the aforesaid casting process (i.e., flowchart 900, FIG. 9) are intended to comport with the chronological stages of the casting process where understandably a 'second' follows a 'first', and simply aims to distinguish the materials of the support 120' and the frame 116 from each other. This is not to be viewed to be in conflict with the expressions 'first material' and 'second material' used elsewhere in the present disclosure. Therefore, with regard to the casting process, the first material can include one or more grades of alloy steel, and the second material can include one or more of ductile iron, gray iron, or cast steel, and compared to the second material of the frame 116, the first material of the support 120' is more effective at preventing slippage of bearing 132.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. An arrangement for supporting one or more bearings of a crankshaft assembly of a hydraulic fracturing pump, comprising:
   a frame, of a first material, defining one or more bearing support profiles; and
   one or more bearing supports, of a second material different from the first material of the frame, that are cast-in-place within the corresponding one or more bearing support profiles of the frame,
      wherein the one or more bearing supports are configured to be in contact with an outer race of the corresponding one or more bearings of the crankshaft assembly.

2. The arrangement of claim 1, wherein each bearing support includes an annular body defining an axis, each bearing support defines a first surface and a second surface,
   both the first surface and the second surface being integrally contactable with the frame to restrict a movement of each bearing support along the axis.

3. The arrangement of claim 2, wherein each bearing support defines a first axial end and second axial end opposite to the first axial end, the first surface being defined at the first axial end and the second surface being defined at the second axial end.

4. The arrangement of claim 1, wherein each bearing support includes an annular body defining an axis, each bearing support defines one or more engagement members integrally engageable with the frame to inhibit a movement of each bearing support about the axis.

5. The arrangement of claim 4, wherein each bearing support defines an inner surface and an outer surface about the axis, the outer surface defining one or more arcuate surface portions and the engagement members defining one or more engagement surface portions on the outer surface, the one or more engagement surface portions protruding radially outwards with respect to the one or more arcuate surface portions.

6. The arrangement of claim 4, wherein the one or more engagement members correspond to a plurality of engagement members, with at least two engagement members of the plurality of engagement members arranged diametrically oppositely to each other on the annular body.

7. The arrangement of claim 1, wherein the first material includes one or more of ductile iron, gray iron, or cast steel and the second material includes one or more grades of alloy steel.

8. A bearing support for a power end of a hydraulic fracturing pump, comprising:
   an annular body defining an axis;
   an inner surface of the annular body configured to engage an outer race of a crankshaft bearing; and
   an outer surface of the annular body configured to fit a bearing support profile of a frame of the power end,
      wherein, at opposite axial ends of the annular body, first and second notches are defined in the outer surface, and
      wherein a portion of the annular body defined axially between the first and second notches is configured to extend radially past an interior surface of the bearing support profile to capture the bearing support against axial movement with respect to the frame of the power end.

9. The bearing support of claim 8, wherein the bearing support is cast-in-place within the bearing support profile of the frame.

10. The bearing support of claim 9, wherein the bearing support being cast-in-place within the bearing support profile of the frame prevents the bearing support from being removed from the frame.

11. The bearing support of claim 8, wherein, at one or more circumferential positions about the axis of the annular body, one or more radial extensions are defined in the outer surface, and wherein the one or more radial extensions are configured to fit a corresponding recess of the bearing support profile of the frame.

12. The bearing support of claim 11, wherein the one or more radial extensions are defined between arcuate surface portions of the outer surface.

13. The bearing support of claim 11, wherein the one or more radial extensions include at least two radial extensions located at diametrically opposite circumferential positions about the axis of the annular body.

14. The bearing support of claim 13, wherein the one or more radial extensions include four radial extensions located at circumferential positions corresponding to 12 o'clock, 1 o'clock, 5 o'clock, and 6 o'clock.

15. A method for manufacturing a frame of a power end of a hydraulic fracturing pump, comprising:
   inserting one or more bearing supports into a mold of the frame, the one or more bearing supports formed of a first material; and
   introducing a second material of the frame, in a molten form, into the mold to cause the one or more bearing supports to be cast-in-place with the frame.

16. The method of claim 15, wherein the first material includes one or more grades of alloy steel and the second material includes one or more of ductile iron, gray iron, or cast steel.

17. The method of claim 15, wherein
   each bearing support includes an annular body defining an axis, each bearing support defines a first surface and a second surface, both the first surface and the second surface being integrally contactable with the frame to restrict a movement of each bearing support along the axis, and
   each bearing support defines a first axial end and second axial end opposite to the first axial end, the first surface being defined at the first axial end and the second surface being defined at the second axial end.

18. The method of claim 15, wherein each bearing support includes an annular body defining an axis, each bearing support defines one or more engagement members integrally engageable with the frame to inhibit a movement of each bearing support about the axis.

19. The method of claim 18, wherein each bearing support defines an inner surface and an outer surface about the axis, the outer surface defining one or more arcuate surface portions and the engagement members defining one or more engagement surface portions on the outer surface, the one or more engagement surface portions protruding radially outwards with respect to the one or more arcuate surface portions.

20. The method of claim 18, wherein the one or more engagement members correspond to a plurality of engagement members, with at least two engagement members of the plurality of engagement members arranged diametrically oppositely to each other on the annular body.

* * * * *